United States Patent [19]

Wade

[11] Patent Number: 5,532,045
[45] Date of Patent: Jul. 2, 1996

[54] VEHICLE PART HAVING WEATHER SEALED MIRROR FINISH DECORATIVE PORTION INTEGRAL THEREWITH

[75] Inventor: Linwood E. Wade, Weston, Conn.

[73] Assignee: Hicks & Otis Prints, Inc., Norwalk, Conn.

[21] Appl. No.: 429,518

[22] Filed: Apr. 26, 1995

Related U.S. Application Data

[62] Division of Ser. No. 204,769, Mar. 2, 1994.

[51] Int. Cl.⁶ ..................................................... B32B 9/00
[52] U.S. Cl. .......................... 428/187; 428/31; 428/43;
428/67; 428/133; 428/192; 428/204; 428/327;
428/463; 428/516; 428/518; 293/128
[58] Field of Search ............................... 428/31, 43, 67,
428/133, 187, 192, 204, 327, 463, 516,
518, 40, 205, 131, 78, 340; 293/128

[56] References Cited

U.S. PATENT DOCUMENTS

| | | | |
|---|---|---|---|
| 3,811,989 | 5/1974 | Hearn | 161/5 |
| 4,351,864 | 9/1982 | Giannakidis | 428/31 |
| 4,398,994 | 8/1983 | Beckett | 156/659 |
| 4,446,179 | 5/1984 | Waugh | 428/31 |
| 4,517,045 | 5/1985 | Beckett | 156/345 |
| 4,877,657 | 10/1989 | Yaver | 428/31 |

*Primary Examiner*—Patrick J. Ryan
*Assistant Examiner*—Abraham Bahta
*Attorney, Agent, or Firm*—St. Onge Steward Johnston & Reens

[57] ABSTRACT

A process for preparing a part for a vehicle, the part having a weather sealed mirror finish decorative portion integral therewith is presented. The inventive process includes the steps of providing a sheet of relatively clear, weather resistant polymeric material having two surfaces, an external surface and an internal surface; providing a sheet of a formable substrate material having a internal surface and an external surface; metallizing a portion of at least one of the internal surfaces of the polymeric material and the substrate material, such that metallization is contained within the edge of the metallized material; adhering the internal surface of the substrate material to the internal surface of the polymeric material such that the metallization is disposed between the polymeric material and the substrate material to form a sandwich; and forming the sandwich into a vehicle part having a weather sealed mirror finish decorative portion.

21 Claims, 2 Drawing Sheets

5,532,045

VEHICLE PART HAVING WEATHER SEALED MIRROR FINISH DECORATIVE PORTION INTEGRAL THEREWITH

This is a divisional of copending application(s) Ser. No. 08/204,769 filed on 3/2/94.

TECHNICAL FIELD

The present invention relates to a vehicle part, especially a trim part for an automobile or truck body, having a weather sealed mirror finish decorative portion integral therewith. Also included is a process for preparing such part.

Chrome plated trim has long been an important feature of both the exterior and interior of automobiles, trucks and other vehicles. The durable mirror finish provided by chrome, which is capable of producing a clear reflected image, has over time become more expensive and commercially disadvantageous, largely because of ecological restrictions on chromium.

One widely used alternative to chrome finishes is a polyester film having aluminum metallized thereon and protected from weathering with a clear extruded vinyl or fluoropolymer film. Since the aluminum layer is typically extremely thin, it is subject to attack by moisture, salt and other materials to which it can be exposed, especially on the exterior of a vehicle. Because of this it is essential that the edges of a metallized aluminum layer be protected from attack. Commonly this is done by embedding the edges while extruding the base to which it is bonded, and then protecting cut ends with protective sealers. This approach is extremely labor intensive. In addition, although it has been somewhat successful, such an approach cannot be extended to the use of a metallized film for other manufacturing techniques. As a result, the parts produced must be linear and provision must be made in the manufacturing process for sealing the edges.

Currently, requirements for vehicle trim combine mirror finish elements with colors, graphics (such as logos or short words or acronyms) and "end caps"—injection molded terminations to beautify cut ends. Generally, because of the limitations of current manufacturing processes, each of these features is incorporated into separate parts which must be joined together to form the finished article. Each part must be individually protected and the schemes to join them together are complex. Accordingly, the production of such parts is very labor intensive and expensive.

What is desired, therefore, is a vehicular trim piece with an integrated decorative finish combining a good distinction of image with a variety of different shapes, along with colors and/or graphics.

BACKGROUND ART

As noted above there have been various attempts to produce a less labor intensive yet desirably decorative trim piece for vehicles. Such attempts can be seen in the prior art, such as in Hearn, U.S. Pat. No. 3,811,989, which discloses a decorative trim strip comprising a substrate having a metal or metallized strip bonded thereto and a layer of clear plastic material covering the metal or metallized strip. Similarly, Giannakidis, in U.S. Pat. No. 4,351,864, discloses a molding having a glazed structure where a bright film is metallized on both sides and then encapsulated in an ionomer resin material. In U.S. Pat. No. 4,446,179, Waugh discloses a trim strip having a decorative surface formed in a longitudinal channel of a molding. An impact resistant plastic overlay is then laid over the decorative surface.

In a more recent improvement described in U.S. Pat. No. 4,877,657, Yaver teaches the production of a flexible trim strip which includes a transparent or translucent core having a bottom surface covered with a opaque layer and a top surface having a thin covering of a metal. A transparent plastic overlay is then applied over the top covering of the metal.

Unfortunately, nothing in the prior art permits the production of a trim material having a mirror finish image of varying shapes thereon where the image is sufficiently protected from the weather.

SUMMARY OF INVENTION

It is an object of the present invention to provide a part for a vehicle, be it exterior or interior, having a weather sealed mirror finish decorative portion integral therewith.

It is another object of the invention to provide such a part where the mirror finish decorative portion has excellent distinction of image yet is protected from damage occasioned by exposure to the elements.

It is yet another object of the invention to provide such a vehicle part where the decorative portion can assume a variety of different shapes while maintaining its protection from the elements.

It is still another objective of the invention to provide a vehicle trim part having a mirror finish decorative portion integral therewith which can further be provided with different colors and/or graphic designs to match interior or exterior colors of the vehicle.

It is another object of the invention to provide such a vehicle part which includes graphics which are either independent of or complementary to the weather sealed mirror finished decorative portion to provide a desired appearance to the vehicle part.

It is a further object of the invention to provide a process for producing such vehicle parts.

These and other objects of the invention can be achieved by the provision of a vehicle part which is comprised of a sheet of relatively clear weather resistant polymeric material and a sheet of a formable substrate material, where a portion of at least one of the surfaces of the polymeric material or the substrate material is metallized in a desired pattern. The polymeric material and the substrate material are then adhered to each other, such that the metallization is disposed between the polymeric material and the substrate material to form a sandwich where the metallization is contained within the edge of the sandwich.

In an alternate embodiment, the vehicle part can comprise a sheet of a relatively clear weather resistant polymeric material having a portion of one of its surfaces metallized in a desired pattern such that the metallization is contained within the edges of the polymeric material. The metallized polymeric material is then adhered to a shaped polymeric material such that the metallization is sandwiched between the first polymeric material and the pre-shaped polymeric material, in order to form a vehicle part.

Other objects, aspects and features of the present invention, in addition to those mentioned above, will be understood from the following detailed description, provided in conjunction with the accompanying drawings.

DETAILED DESCRIPTION OF THE PREFERRED EMBODIMENT

Figure 1:
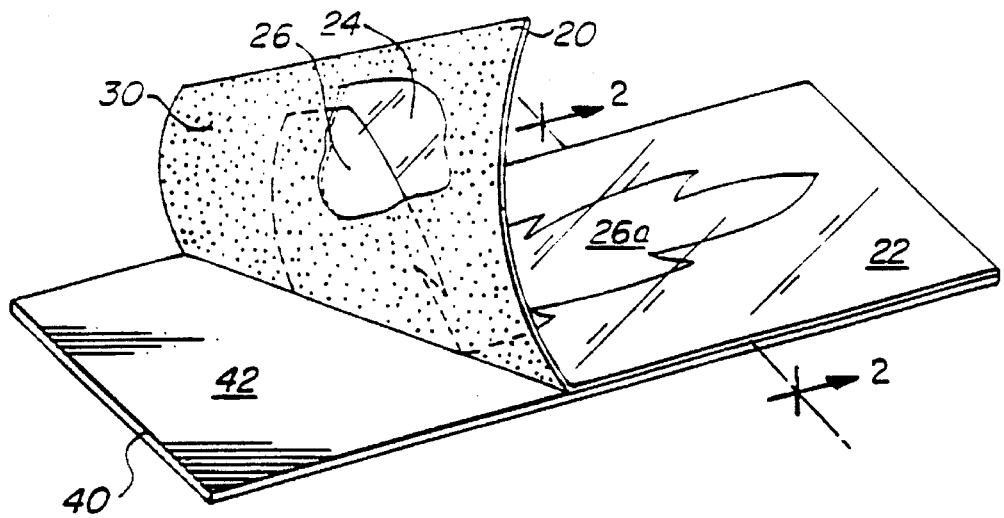
FIG. 1 is a partially delaminated perspective view of metallized and adhesive coated polymeric material and substrate material in accordance with the present invention.
Figure 2:
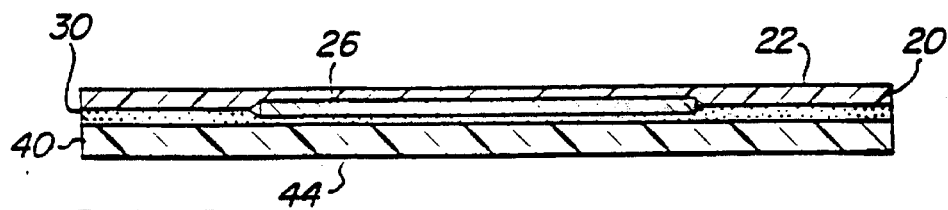
FIG. 2 is a cross-sectional view along lines -2—2- of the embodiment of FIG. 1.

Referring now to FIGS. 1–9 where like elements are identified by like numbers in the drawings, a process is presented for preparing a vehicle trim part 10, which is suitable for use as trim on the exterior or interior of a vehicle. The terms "front", "back", "top", "bottom", etc. as used herein shall refer to part 10 when in the orientation illustrated in FIG. 1. However, it will be understood that this is for convenience only and part 10 can assume various orientations when installed in or on a vehicle.

Additionally, for convenience, this description shall refer to an automobile or a car. However, it will be understood that part 10 can be used on any vehicle, including trucks, recreational vehicles, utility vehicles, off-road vehicles, etc.

Refering now to FIG. 1, the inventive process begins with the provision of a sheet of relatively clear weather resistant polymeric material 20, which has two surfaces, denoted an external surface 22 (the top surface in the orientation illustrated in FIG. 1) and an internal surface 24 (the bottom surface in the orientation illustrated in FIG. 1). The sheet of polymeric material 20 can comprise a continuous web of material which is cut before or after treatment into the appropriate lengths. Alternatively, sheet of polymeric material 20 can be individual sheets or it can have the shape of part 10 as finished, prior to further processing. Commonly, sheet of polymeric material 20 is a continuous web which, after metallization and further treatment as described hereinbelow, is cut into the appropriate lengths and cut to the proper shape. Desirably, polymeric material is maintained as a continuous web as long as possible prior to cutting, to facilitate handling.

Sheet of polymeric material 20 can be made of any polymeric film material which has the weatherability and resistance to staining or discoloration when exposed to fluids, salt, gas, cleaners, etc. so as to remain clear in the environment to which it is to be exposed, such as the external areas of a car. Areas of polymeric material 20 can be texturized, etc., and do not necessarily have to remain smooth. The clarity, resistance to staining and discoloration and texture of polymeric material 20 should be sufficient to maintain good distinction of image of the mirror finish material described hereinbelow when viewed through polymeric material 20.

The polymeric material 20, otherwise commonly referred to as a "clear coat", can be any polymeric material having the noted properties. Typically, the material is a fluoropolymer or vinyl polymer film, which can be compounded with agents such as antioxidants and ultraviolet light (UV) absorbers. Two typical polymeric material useful herein are a polyvinylidene fluoride (PVDF) film and an unoriented polyvinyl fluoride (PVF) film commercially available under the trade name SP Tedlar from DuPont DeNemours Company of Wilmington, Del.

In addition, polymeric material 20 can comprise other polymeric materials such as polyethyltetrafluoroethylene, acrylic, polyurethane, polycarbonate, polyester, melamine, urea formaldehyde, polyvinylchloride, silicone, silica or mixtures of any of the above. These polymers can be clear or tinted. Moreover, multilayer coatings such as polyvinylchloride with acrylic overlayer, can be employed as polymeric material 20.

The thickness of polymeric material 20 should be that sufficient to protect underlying layers from the elements, especially weather. Typically, polymeric material 20 need only have a thickness of at least about 0.3 mils, and can be as thick as about 10 mils. If polymeric material 20 is a vinyl polymer film, and not a fluoropolymer film, it should have a thickness of at least about 5 mils and is generally about 5 to about 30 mils thick.

The polymeric material 20 is then metallized as shown in FIG. 1, that is a layer of metal 26 is applied to internal surface 24 of polymeric material 20. The surface to which the layer of metal 26 is applied is referred to as internal surface 24 of polymeric material 20, since this surface shall be an internal surface of vehicle part 10. The remaining surface is denoted external surface 22, since it is on the external portion of vehicle part 10.

Metallization can be performed by any of a wide variety of methods. For instance, metallization can be applied by sputtering, vapor deposition, ion beam deposition or chemical vapor deposition.

One advantageous method of metallizing sheet of polymeric material 20 involves forming a coating of a metal on internal surface 24 by directing a stream of metal vapor or atoms onto the surface by a vacuum deposition technique. This can be effected by heating the metal in a high vacuum, preferably in the range of about $10^{-3}$ to about $10^{-2}$ torr, to a temperature above its melting point, such that the vapor pressure of the metal exceeds about $10^{-2}$ torr. It can also be effected by subjecting the metal to a stream of bombarding ions whereby the metal is removed by mass transfer "sputtering". When these conditions are achieved, the metal is vaporized or sputtered, emitting metal vapor or atoms in all directions. These vapors or atoms impinge on the internal surface 24 of polymeric material 20, condense, and thereby form a thin metallic coating on polymeric material 20.

It may be useful, prior to metallization, to prepare internal surface 24 of polymeric material 20 to promote adhesion of the metal thereto. This can be done by first coating internal surface 24 with a material which will promote adhesion, or by treating internal surface 24 in a manner which will promote adhesion.

Most commonly, the metal used to form metal layer 26 is aluminum, although other metals can be used depending on the desired appearance of the resulting mirror finish decorative portion 26a of part 10. When aluminum is the metal, the thickness of metal layer 26 should be at least about 75 angstroms, and can range as high as about 275 angstroms. Thicknesses up to about 3000 angstroms may be desirable in some cases. For other metals, other thicknesses may be desirable.

As noted above and illustrated with reference to FIGS. 3 and 4, internal surface 24 of sheet of polymeric material 20 is metallized in a desired pattern. This can be accomplished by providing a uniform coat of metal and then selectively demetallizing in a pattern. For instance, a protective physical or chemical mask can be applied over the desired pattern of metal layer 26 and the remaining, unprotected metal dissolved by appropriate chemical or physical means.

In addition, a chemical mask can be applied to internal surface 24 prior to metallization, which permits metal applied thereover to be rinsed or dissolved away by chemical means, leaving the desired pattern. In another suitable method, a physical mask can be applied over internal surface 24 prior to metalization, such that metallization occurs on internal surface 24 only in areas not covered by the physical mask; or the desired pattern can be produced by hot stamping of a metallized transfer sheet having a release coating by aligning polymeric material 20 with the transfer sheet and then pressing on its back with a heated "shoe" in the desired pattern. Each of these methods of selectively demetallizing, or metallizing in a desired pattern, comprise conventional treatment processes which should be familiar to the skilled artisan.

One especially advantageous means of providing metallization in a desired pattern on internal surface 24 is disclosed by Beckett in U.S. Pat. No. 4,398,994, the disclosure of which is incorporated herein by reference. In the process disclosed by Beckett, a metallized film has a sodium hydroxide resistant material printed thereon in the desired pattern. The sodium hydroxide resistant material printed on the metallized layer is preferably a water insoluble resinous material, and it can be pigmented or clear. The non-printed metallized areas are then dissolved with a hot aqueous sodium hydroxide solution, which has a sodium hydroxide concentration of up to about 25%, to dissolve the unprotected metal yet leave the protected metallized areas undissolved. In this manner, metallization in a variety of intricate patterns can be accomplished, as opposed to the linear metallization seen in the prior art.

Figure 3:
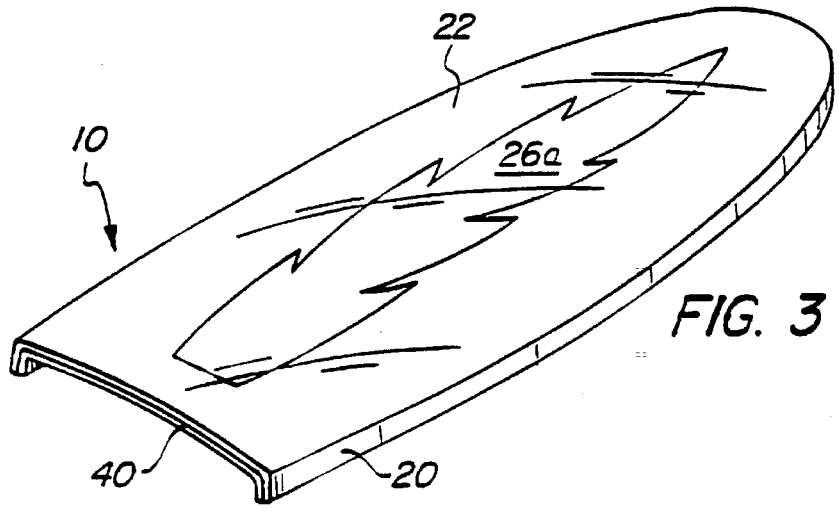
FIG. 3 is a cut-away perspective view of a finished part in accordance with the present invention.

In metallizing internal surface 24 of sheet of polymeric material 20, care must be taken that metallization does not extend to the edge of the metallized material or more specifically to the edge of vehicle part 10 to be made from metallized material 20, as illustrated in FIG. 3, else protection from the elements will not be complete.

Optionally, a pattern or image can be printed on polymeric material 20 prior to metallization. This imprinting can be a logo or other desirable design, and can advantageously cooperate with the metallization to provide the impression of depth or to otherwise complement the mirror finish portion 26a. Printing on polymeric material 20 can be by any means conventional in the art, such as by rotogravure or screen printing, as well as other methods within the skill of the artisan.

Once polymeric material 20 is metallized in a desired pattern, an adhesive 30 is printed or coated across metallized polymeric material 20 in a preferred embodiment of the present invention illustrated in FIGS. 1–4. The nature of adhesive 30 depends on the nature of polymeric material 20 and the substrate material to which polymeric material 20 is to be adhered. Generally, adhesive 30 can be a thermoplastic or cross-linked (with or without aid of an active or latent crosslinking agent) polyester, acrylic, polyamid or urethane adhesive capable of preventing delamination of vehicle part 10 as well as polyvinylchloride or epoxy, or mixtures of any of the above.

Advantageously, adhesive 30 is colored or pigmented, to match or complement either the interior or exterior colors of the car. Different pigments, such as metallic or pearlescent pigments, can be included in adhesive 30 in addition to micronized titanium oxide, fluorescent pigments or graphite. Additionally, other dye, coloring or pigment materials can be included to provide the desired color and appearance to vehicle part 10.

Referring still to FIGS. 1–4, a sheet of a formable substrate material 40 is then provided, as either a continuous web, an individual sheet, or a sheet in the final shape of part 10, as was the case with polymeric material 20. Formable substrate material 40 also has two surfaces, one denoted an internal surface 42 (the top surface in the orientation of FIG. 1), and the other an external surface 44 (the bottom surface in the orientation of FIG. 1), with internal surface 42 being the surface which is adhered to polymeric material 20 internal surface 24.

Sheet of formable substrate material 40 is formed of any suitable material which is capable of being formed into a desired shape, is able to withstand further processing, and will adhere well to a backing material introduced behind it, when material is to be introduced behind it (as discussed in more detail hereinbelow). Typically substrate material 40 comprises a polyolefin, a polyvinyl chloride or an acrylonitrile-butadiene-styrene copolymer. Other suitable materials include polypropylene, thermoplastic elastomers such as thermoplastic olefins or urethanes, polystyrene, polyurethane, polycarbonate or mixtures of any of the above in single or multiple layers. The thickness of substrate material 40 is generally at least about 1 mil and is more preferably between about 10 and about 30 mils, although thicker sheets are permissible.

Sheet of substrate material 40 is laminated or otherwise adhered to polymeric material 20. Depending on the nature of adhesive 30, adhesive 30 can be cured merely by the application of pressure, by the application of heat and pressure, or through other means of curing adhesive 30 to prevent separation of substrate material 40 from polymeric material 20. Alternatively, polymeric material 20 can be extruded onto substrate material 40, or vice versa, eliminating the need for adhesive 30.

Once substrate material 40 and polymeric material 20 are adhered together, thereby completely sandwiching metal layer 26 therebetween, part 10 can be formed into its final three-dimensional shape.

Figure 4:
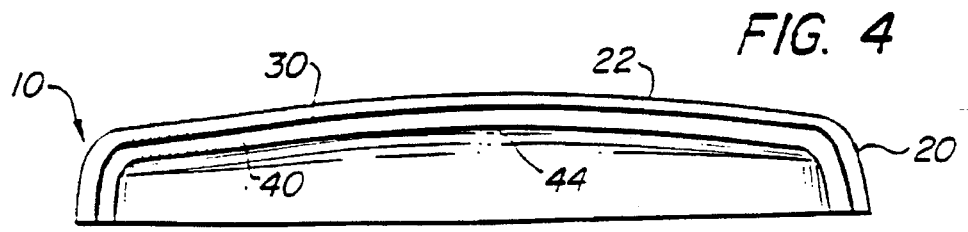
FIG. 4 is an end view of the part of FIG. 2.

If polymeric material 20 and substrate material 40 are provided as continuous webs, they can be cut into the desired lengths and/or shapes either prior to or following formation into the final three-dimensional shape of part 10 illustrated in FIGS. 3 and 4. As noted above, cutting is advantageously as late as possible to facilitate handling.

Figure 5:
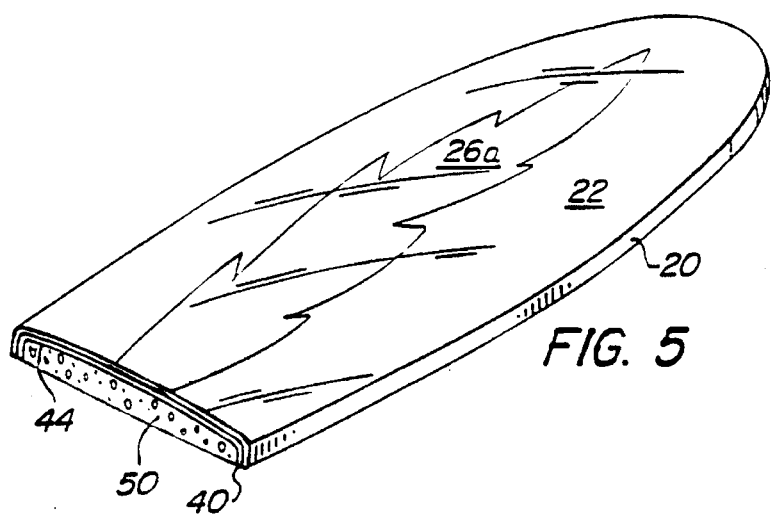
FIG. 5 is a cut-away perspective view of a finished part in accordance with the present invention, having a backing material applied thereto.
Figure 6:
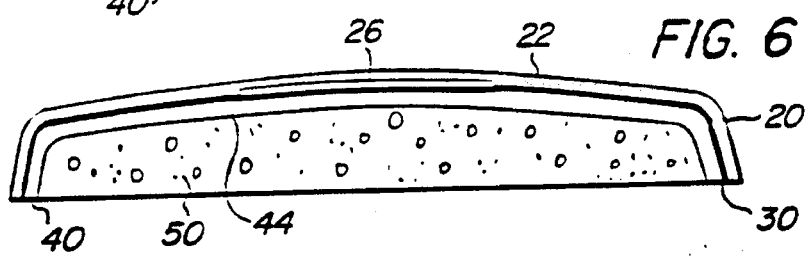
FIG. 6 is an end view of the part of FIG. 5.

The laminated sandwich of polymeric material 20 and substrate material 40 can be formed into the 3-dimensional shape of part 10 by any suitable technique such as vacuum forming, pressure-assisted forming, hydraulic molding or via the use of a silicone blanket and pressure. Once formed into the final shape of part 10, part 10 can be used as is or a backing material 50 such as a polyvinyl chloride, a polyolefin, an acrylonitrile-butadiene-styrene copolymer or a urethane can be molded into the rear of part 10 to provide support, as shown in FIGS. 5 and 6. This molding can be through injection or other types of molding, casting, or the use of a foaming material as would be familiar to the artisan.

In an alternate embodiment of the present invention, substrate material 40 can be metallized in a desired pattern in place of polymeric material 20 (and by the same methods). Polymeric material 20 can then be overlaid and adhered to substrate material 40, forming the sandwich described above. Although not as desirable, forming vehicle part 10 in this manner will provide an acceptably usable vehicle trim part.

Figure 8:
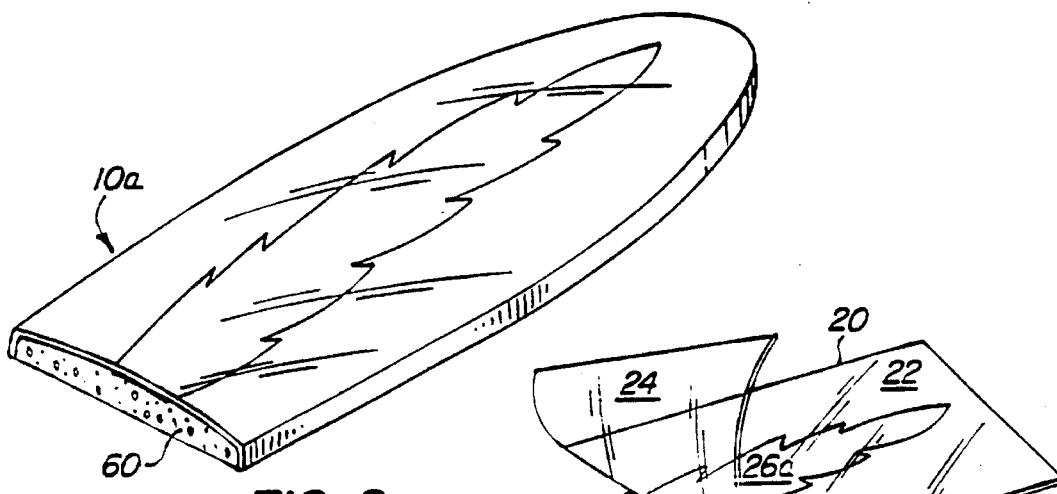
FIG. 8 is a cut-away perspective view of a finished part formed from the embodiment of FIG. 7.
Figure 7:
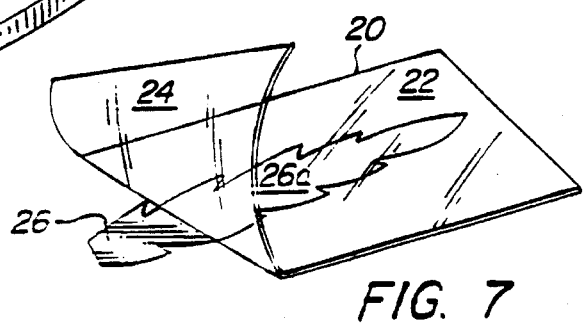
FIG. 7 is a partially delaminated perspective view of metallized polymeric material in accordance with an alternate embodiment of the present invention.
Figure 9:
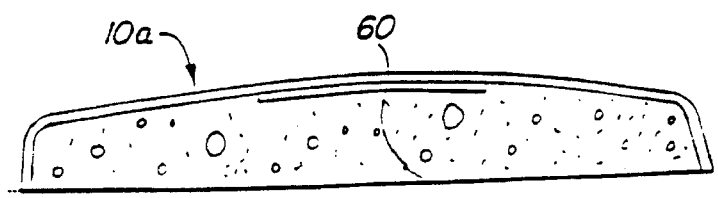
FIG. 9 is an end view of the part of FIG. 8.

In still another alternative embodiment of the present invention illustrated in FIGS. 7–9, polymeric material 20 can be metallized as described above and then coextruded with a pre-shaped polymeric material 60, such as an extruded polyvinyl chloride or other material backing profile. This can be performed as the backing profile exits an extruder or the metallized sheet of polymeric material 20 can be fed into a shoe with pre-shaped polymeric material 60, and fused or otherwise adhered thereto to form a finished vehicle part 10a.

Finished vehicle part 10, when viewed from external surface 27 of polymeric material 20, should exhibit a mirror finish decorative portion 26a which corresponds to the metal layer 26 sandwiched between polymeric material 20 and substrate material 40. This mirror finish should provide a high resolution reflection even when viewed through polymeric material 20. The desired high mirror image reflection can be describe as a good distinction of image, which can be measured by comparison with the General Motors standard P9, used as a generally accepted standard for distinction of image.

The present invention provides a vehicle part which has a weather sealed mirror finish decorative portion integral therewith. Since the metallized area is within the edges of vehicle part 10, and since polymeric material 20 and substrate material 40 are adhered together, potentially corrosive and other destructive elements are kept away from the metal layer 26. In this manner, many of the problems with conventional chrome or metallic finishes are avoided. In addition, the process of the invention permits the mirror finish decorative portion to assume a wide variety of shapes, including logos, lettering, or other desirable graphic appearances, as opposed to the linear appearance of prior art metallized finishes.

Moreover, because the mirror finish decorative portion is integral with vehicle part 10, vehicle part 10 is often more lightweight than its prior art counterparts, and requires fewer assembly steps, leading to significant savings.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A vehicle part having a weather sealed mirror finish decorative portion integral therewith, comprising a sheet of relatively clear, weather resistant polymeric material having two surfaces, an external surface and an internal surface and a sheet of a formable substrate material having a internal surface and an external surface wherein a portion of at least one of the internal surfaces of the polymeric material and the substrate material being metallized in a desired pattern, such that metallization is contained within the edge of the metallized material; the internal surface of the substrate material being adhered to the internal surface of the polymeric material such that the metallization is disposed between the polymeric material and the substrate material to form a sandwich; the sandwich being formed into a vehicle part having a weather sealed mirror finish decorative portion.

2. The vehicle part of claim 1 wherein the polymeric material comprises a sheet of a relatively weather and stain resistant polymeric material having a clarity sufficient to permit a good distinction of image of the metallization, when viewed through its external surface, and a thickness of between about 0.3 mil to about 10 mil.

3. The vehicle part of claim 1 wherein the adhesive is colored.

4. The vehicle part of claim 3 wherein the adhesive is colored to match or complement the exterior or interior colors of the vehicle.

5. The vehicle part of claim 1 wherein the substrate material comprises a polyolefin, a polyvinyl chloride, an acrylonitrile-butadiene-styrene copolymer, polypropylene, polystyrene, polyurethane, polycarbonate, a thermoplastic olefin or urethane, or mixtures or layers thereof having a thickness of at least about 1 mil.

6. A vehicle part having a weather sealed mirror finish decorative portion integral therewith, comprising a sheet of relatively clear, weather resistant first polymeric material having two surfaces, an external surface and an internal surface wherein a portion of the internal surface of the first polymeric material being metallized in a desired pattern, such that metallization is contained within the edge of the metallized material; the internal surface of the first polymeric material being adhered to a shaped polymeric material such that the metallization is disposed between the first polymeric material and the shaped polymeric material to form a vehicle part having a weather sealed mirror finish decorative portion.

7. The vehicle part of claim 6 wherein the first polymeric material comprises a sheet of a relatively weather and stain resistant polymeric material having a clarity sufficient to permit a good distinction of image of the metallization, when viewed through its external surface, and a thickness of between about 0.3 mil to about 10 mil.

8. The vehicle part of claim 6 wherein the metallized first material is adhered to the shaped polymeric material via an adhesive, fusing the two polymeric materials together, or coextruding the two polymeric materials.

9. The vehicle part of claim 8 wherein an adhesive is disposed between the internal surface of the first polymeric material and the shaped polymeric material.

10. The vehicle part of claim 9 wherein the adhesive is colored.

11. The vehicle part of claim 10 wherein the adhesive is colored to match or complement the exterior or interior colors of the vehicle.

12. The vehicle part of claim 1 wherein the shaped polymeric material comprises a polyvinyl chloride, a polyolefin, an acrylonitrile-butadiene-styrene copolymer, a urethane, or mixtures thereof.

13. A process for preparing a part for a vehicle, the part having a weather sealed mirror finish decorative portion integral therewith, the process comprising:

i. providing a sheet of relatively clear, weather resistant polymeric material having two surfaces, an internal surface and an external surface;

ii. metallizing in a desired pattern a portion of the internal surface of the polymeric material to form a metallized polymeric material, provided the metallization does not extend to the edge of the metallized polymeric material;

iii. adhering the internal surface of the metallized polymeric material to a shaped polymeric material to provide a decorative vehicle part having a weather sealed mirror finish decorative portion.

14. The process of claim 13 wherein the polymeric material comprises a sheet of a relatively weather and stain resistant polymeric material having a clarity sufficient to permit a good distinction of image of the metallization, when viewed through its external surface, and a thickness of between about 0.3 mil to about 10 mil.

15. The process of claim 14 wherein the polymeric material comprises a sheet of a fluoropolymer or a vinyl polymer, an acrylic, polyurethane, polycarbonate, polyester, melamine, formaldehyde, polyvinylchloride, silicone, silica or mixtures or layers thereof.

16. The process of claim 13 wherein the sheet of polymeric material has a pattern printed thereon.

17. The process of claim 13 wherein the metallized polymeric material is adhered to the shaped polymeric material via an adhesive, fusing the two polymeric materials together, or coextruding the two polymeric materials.

18. The process of claim 17 wherein an adhesive is coated on the internal surface of the polymeric material, after metallization, when the metallized polymeric material is to be adhered to the shaped polymeric material.

19. The process of claim 18 wherein the adhesive is colored.

20. The process of claim 19 wherein the adhesive is colored to match or complement the exterior or interior colors of the vehicle.

21. The process of claim 13 wherein the shaped polymeric material comprises a polyvinyl chloride, a polyolefin, an acrylonitrile-butadiene-styrene copolymer, a urethane, or mixtures thereof.

* * * * *